J. B. Wickersham,
Folding Bedstead,
No. 1,101. Reissued Dec. 18, 1860.
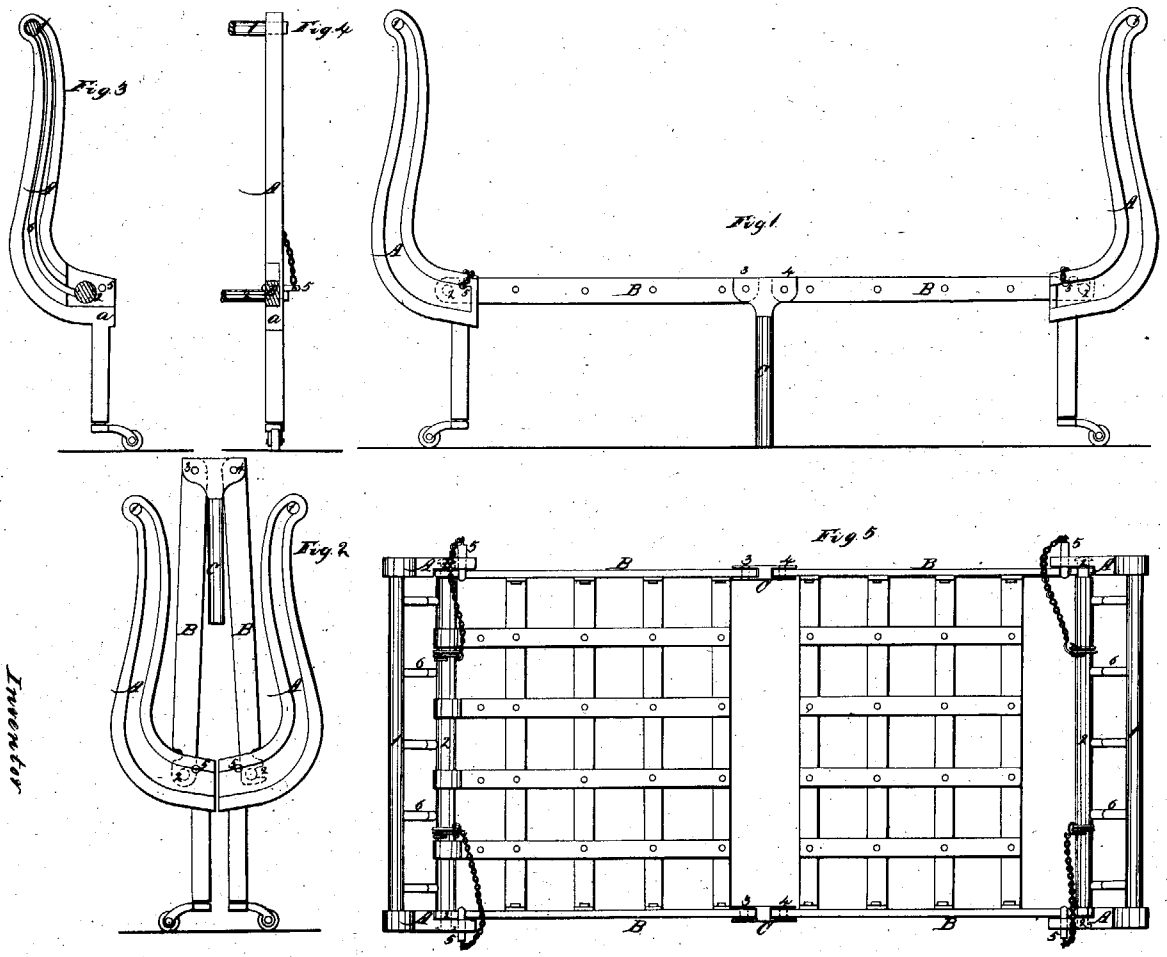
Witnesses.
Lemuel W. Serrell
Chas. H. Smith
Inventor
John B. Wickersham

UNITED STATES PATENT OFFICE.

JOHN B. WICKERSHAM, OF BROOKLYN, NEW YORK.

IMPROVEMENT IN FOLDING BEDSTEADS.

Specification forming part of Letters Patent No. 17,460, dated June 2, 1857; Reissue No. 1,101, dated December 18, 1860.

*To all whom it may concern:*

Be it known that I, JOHN B. WICKERSHAM, of Brooklyn, in the county of Kings and State of New York, have invented, made, and applied to use a new and useful Improvement in Folding or Portable Iron Bedsteads; and I do hereby declare that the following is a full, clear, and exact description of the construction and operation of the same, reference being had to the annexed drawings, making part of this specification, wherein—

Figure 1 is a side elevation of an iron bedstead with my improvement as open ready for use. Fig. 2 is an elevation of the same in its closed position or folded up. Fig. 3 is an elevation of the inner side of one of the legs. Fig. 4 is an edge view of the same. Fig. 5 is a plan of the bedstead as opened for use.

Similar marks of reference denote the same parts.

Metallic bedsteads have been constructed in such a manner as to fold up, and to show the distinction between my construction of bedstead and others, I will briefly describe the parts that have been employed before my said invention.

A short projecting bar or plate with two holes has heretofore been riveted onto each post of the bedstead and each of the horizontal rails has been provided with two similar holes. Through the end holes a tie-rod has been passed that became a center-pin on which to fold up the bedstead, and then by the insertion of a pin through the respective pairs of conciding holes the bedstead has been retained in an unfolded position; but this construction involved difficulties and was unreliable; difficult on account of getting the holes for the pins to match, particularly when the bedstead gets bent or twisted, as is often the case; unreliable because all the strain comes on the pins, and the bedstead falls down unless the pins are inserted. The pins have also been thrown in by springs; but the same objections apply to this method, and the cost is considerably enhanced.

The nature of one portion of my said invention consists in forming a shoulder or support in each corner-post, receiving the horizontal rails when the bedstead is opened, in combination with a pin inserted over the rail, whereby the weight and strain are taken on said shoulder or support of the post, and the joint-pin and movable pin relieved of the same, and no difficulty arises in introducing the pin, because the side rails are supported and the bedstead will stand, even without inserting the movable pins, thereby greatly facilitating the insertion or withdrawal of the pins in folding or unfolding the bedstead.

The bedstead is to be of any width or length, and the parts may be formed more or less ornamental.

A A are the metallic post connected by rods 1 and 2, to form either the head or foot guard. B B are the side rails jointed at 3 and 4 to the short legs C in the usual manner, so that when unfolded the square points of the shoulders abut against said leg and retain the same vertically. *a* is a shoulder or support formed on or by a recess in the post A, against which the rails B, at or near their ends, rest, and the rods 2 pass through holes in the ends of the rails B in such a manner as to allow the bedstead to assume a folded or unfolded position by the rails B being turned on said rods, as shown; and for convenience of transportation the rails B at one end may be notched above the hole, so as to allow the same to be unhooked. 5 5 are movable pins inserted through corresponding holes above the rails B, where the bedstead is in an unfolded position, to confine said rails to the shoulder *a*, and the upper part of the rails B may be slightly notched to pass the said pin or not, provided the casting of the post be sufficiently wide to allow room for the pin entirely above said rail, which latter arrangement I prefer as preserving the entire strength of the rail B.

By reference to Figs. 3 and 5 it will be seen that the cross-bars 2 2 perform two functions, the one to connect the folding bottom of the bedstead to the head or foot guards or boards, the other to receive directly the metallic work 6 6, forming the head and foot guards themselves, thereby avoiding the use of a second cross-bar at this point, which was in use for this purpose before my present invention.

I do not claim to be the first inventor of a folding bedstead; neither do I claim securing the side rails by the insertion of a pin through two holes; but

What I claim, and desire to secure by Letters Patent, is—

1. Determining the relative position of the head or foot guards with the side rails when the bedstead is in an unfolded position by means of a stop or support substantially as specified.

2. The pins 5 5, inserted as set forth, in combination with the stops or supports, as specified.

JOHN B. WICKERSHAM.

Witnesses:

LEMUEL W. SERRELL,
CHAS. H. SMITH.